US011922806B2

(12) United States Patent
Wang et al.

(10) Patent No.: US 11,922,806 B2
(45) Date of Patent: Mar. 5, 2024

(54) SYSTEM AND METHOD ENABLING VALIDATION-AS-A-SERVICE FOR CONTINUOUS VALIDATION OF ADVANCED DRIVER ASSISTANCE SYSTEMS AND AUTONOMOUS VEHICLES

(71) Applicant: GM Global Technology Operations LLC, Detroit, MI (US)

(72) Inventors: Shige Wang, Northville, MI (US); Wei Tong, Troy, MI (US); Shuqing Zeng, Sterling Heights, MI (US); Xiaofeng Frank Song, Novi, MI (US); Sourav Dey, South Lyon, MI (US); Praveen Choudhury, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 269 days.

(21) Appl. No.: 17/679,368

(22) Filed: Feb. 24, 2022

(65) Prior Publication Data

US 2023/0267831 A1 Aug. 24, 2023

(51) Int. Cl.

| | |
|---|---|
| ***G08G 1/017*** | (2006.01) |
| ***G07C 5/00*** | (2006.01) |
| ***G07C 5/02*** | (2006.01) |
| ***G08G 1/01*** | (2006.01) |

(52) U.S. Cl.

CPC ............. *G08G 1/017* (2013.01); *G07C 5/008* (2013.01); *G07C 5/02* (2013.01); *G08G 1/0112* (2013.01)

(58) Field of Classification Search

CPC .... G08G 1/017; G08G 1/0112; G08G 1/0129; G08G 1/0133; G08G 1/0141; G08G 1/22; G07C 5/008; G07C 5/02; B60W 40/00

USPC ........................................................ 701/29.3

See application file for complete search history.

(56) References Cited

U.S. PATENT DOCUMENTS

| | | | | |
|---|---|---|---|---|
| 6,505,106 | B1 * | 1/2003 | Lawrence | G01M 15/05 701/32.4 |
| 10,482,003 | B1 * | 11/2019 | Bondor | G01M 17/06 |
| 11,556,949 | B2 * | 1/2023 | Brannan | G08G 1/202 |
| 2017/0011562 | A1 * | 1/2017 | Hodges | H04W 4/46 |
| 2019/0066396 | A1 * | 2/2019 | Jiang | G01S 7/52004 |
| 2021/0357964 | A1 * | 11/2021 | Brannan | H04W 4/44 |

(Continued)

FOREIGN PATENT DOCUMENTS

CN 101681531 A * 3/2010

*Primary Examiner* — Muhammad Shafi

(74) *Attorney, Agent, or Firm* — Vivacqua Crane PLLC

(57) ABSTRACT

An automobile vehicle continuous validation system includes a backend collecting data from a vehicle fleet and wirelessly communicating with the vehicle fleet. The backend is in wireless communication with at least one client. A vehicle module is provided on-board individual ones of multiple automobile vehicles of the vehicle fleet and performing an on-board vehicle validation analysis. A fleet-based validation module provided either at the backend or cloud based manages data defining a configuration of and a capability of the multiple automobile vehicles of the vehicle fleet. A validation manager generates validation tasks based on a user's definition or a desired production of the validation tasks of the validation analysis and a fleet vehicle availability. A client-side module remote from the multiple automobile vehicles of the vehicle fleet has interface items applied by the at least one client seeking to perform the validation analysis.

20 Claims, 4 Drawing Sheets

(56) References Cited

U.S. PATENT DOCUMENTS

| | | | | |
|---|---|---|---|---|
| 2021/0375076 | A1* | 12/2021 | Scotland .............. | G07C 5/0825 |
| 2023/0343210 | A1* | 10/2023 | Tong .................... | G08G 1/0145 |

* cited by examiner

SYSTEM AND METHOD ENABLING VALIDATION-AS-A-SERVICE FOR CONTINUOUS VALIDATION OF ADVANCED DRIVER ASSISTANCE SYSTEMS AND AUTONOMOUS VEHICLES

INTRODUCTION

The present disclosure relates to automobile vehicle operating and monitoring system validation.

Automobile vehicle operating and monitoring systems require validation to confirm proper operation. Conventionally, a new model or type of vehicle is constructed and operated for extended periods to capture operational data from multiple different operating scenarios including urban driving, highway driving, different weather condition operations, and the like. This approach is very time consuming and requires collection of extremely large volumes of data to allow validation of the vehicle or class. A camera-based forward collision alert system may be validated by driving an extensive period of time on a road. Although the test is extensive, it is impossible to cover all driving scenarios during this type of road driving validation approach.

Automobile vehicle advanced driver assistance system (ADAS) and autonomous vehicle (AV) features need to operate in a very complex environment with uncertainties and during rare events that can be extremely challenging to enumerate using the above conventional validation approaches. Thoroughly testing and validating those features will then have to rely on continuous operation of these features requiring the above noted massive collection and annotation of data.

Thus, while current rear camera systems for automobile vehicles have been validated to achieve their intended purpose, there is a need for a new and improved camera based adaptive taillight system.

SUMMARY

According to several aspects, an automobile vehicle continuous validation system includes a backend collecting data from a vehicle fleet and wirelessly communicating with the vehicle fleet. The backend is in wireless communication with at least one client. A vehicle module is provided on-board individual ones of multiple automobile vehicles of the vehicle fleet and performing an on-board vehicle validation analysis. A fleet-based validation module provided either at the backend or cloud based manages data defining a configuration of and a capability of the multiple automobile vehicles of the vehicle fleet. A validation manager generates validation tasks based on a user's definition or a desired production of the validation tasks of the validation analysis and a fleet vehicle availability. A client-side module remote from the multiple automobile vehicles of the vehicle fleet has interface items applied by the at least one client seeking to perform the validation analysis.

In another aspect of the present disclosure, the vehicle module includes: a wireless communication component managing communications between the backend and individual vehicle systems of the multiple automobile vehicles; and a task manager receiving tasks, queries and commands, scheduling execution of the tasks, queries and commands based on predefined priorities and interacting with vehicle users, and forwarding results of validation task requests, requested and generated data, and vehicle profiles to the backend.

In another aspect of the present disclosure, a human-machine-interface (HMI) is provided, the task manager further in communication with the HMI and responsible to process an override signal from a user of one or more of the automobile vehicles of the vehicle fleet received via the HMI.

In another aspect of the present disclosure, the task manager is in communication with the wireless communication module.

In another aspect of the present disclosure, the wireless communication component receives the validation tasks, commands and queries from the backend and forwards validation analysis results and a group of vehicle profiles from the vehicle fleet to the backend.

In another aspect of the present disclosure, a wireless client communication uplink uploads data and requests for vehicle fleet validation data to the backend including validation requests, task definitions, and job queries via the wireless client communication uplink. A wireless client communication downlink having data including vehicle operation states, validation job progress, validation results and costs returned via the wireless client communication downlink to the backend.

In another aspect of the present disclosure, the client-side module includes a client interface monitoring and controlling client requests output to the fleet-based validation module and validation data returned to the at least one client.

In another aspect of the present disclosure, a fleet vehicle manager is in communication with a fleet vehicle database and a communication device, the fleet vehicle manager maintaining fleet vehicle information including adding new vehicles to the fleet vehicle database, removing old or discontinued vehicles, managing vehicle capability information, and updating new vehicle features and capabilities.

In another aspect of the present disclosure, the vehicle fleet contains multiple automobile vehicles of multiple different makes and models operating at any location in the world; and the at least one client includes service users, suppliers, original equipment manufacturers (OEMs), and government agencies.

In another aspect of the present disclosure, an emulator is in communication with the validation manager allowing the tasks to be profiled prior to being deployed to confirm if a vehicle to which the tasks may be requested has a capability to perform the required validation analysis.

According to several aspects, an automobile vehicle continuous validation system includes a backend collecting data from at least one automobile vehicle and wirelessly communicating with the at least one automobile vehicle, the backend further in wireless communication with at least one client. A vehicle module is provided on-board the least one automobile vehicle and performing a validation analysis. A validation manager generates validation tasks for the validation analysis based on a user's definition or a desired production of the validation tasks and an availability of the at least one automobile vehicle. An emulator profiles the validation tasks prior to being deployed to confirm if the at least one automobile vehicle to which the validation tasks is requested has a capability to perform the validation analysis. A client-side module remote from the at least one automobile vehicle has interface items applied by the at least one client seeking to perform the validation analysis.

In another aspect of the present disclosure, the at least one automobile vehicle defines multiple automobile vehicles of a vehicle fleet.

In another aspect of the present disclosure, a fleet-based validation module is in communication with the validation manager and is provided either at the backend or cloud based, the fleet-based validation module managing data defining a configuration of and a capability of the multiple automobile vehicles of the vehicle fleet.

In another aspect of the present disclosure, a wireless communication module receives the validation tasks, queries and commands, and schedules execution of the validation tasks based on predefined priorities and interacts with vehicle users. A wireless client communication downlink returns data including vehicle operation states, validation job progress, validation results and costs from the backend via a wireless client communication downlink in response to the validation requests.

In another aspect of the present disclosure, a task manager is in communication with the wireless communication module. A job manager is in communication with the task manager. A job executor is responsible to execute jobs and control multiple sensor gateways and vehicle systems so that data will be received by the job executor.

In another aspect of the present disclosure, a profile manager is in communication with the task manager and the job executor and manages vehicle capability profiles including sensor configurations, types of sensors available, types of the automobile vehicles available, and maximum available resources. The profile manager also manages run-time profiles including resource usage and task and job statistics.

In another aspect of the present disclosure, a first gateway defining a sensor gateway is in communication with the job executor and the job manager, the sensor gateway communicating with multiple on-board sensors of the at least one automobile vehicle providing sensed signals for an operating environment of the at least one automobile vehicle. A second gateway defining a vehicle system gateway is in communication with the job manager.

According to several aspects, a method for performing continuous validation of a vehicle fleet comprises: collecting data from the vehicle fleet via a backend and wirelessly communicating with the vehicle fleet, the backend further wirelessly communicating with at least one client; performing an on-board vehicle validation analysis using a vehicle module provided on-board individual ones of multiple automobile vehicles of the vehicle fleet; managing data defining a configuration of and a capability of the multiple automobile vehicles of the vehicle fleet using a fleet-based validation module provided either at the backend or cloud based; generating validation tasks using a validation manager based on a user's definition or a desired production of the validation tasks of the validation analysis and a fleet vehicle availability; and applying interface items via a client-side module remote from the multiple automobile vehicles of the vehicle fleet by the at least one client seeking to perform the validation analysis.

In another aspect of the present disclosure, the method further includes maintaining fleet vehicle information including adding new vehicles to the fleet vehicle database, removing old or discontinued vehicle data from the vehicle fleet, managing vehicle capability information, and updating new vehicle features and capabilities using a fleet vehicle manager in communication with a fleet vehicle database and a communication device.

In another aspect of the present disclosure, the method further includes profiling the validation tasks using an emulator in communication with the validation manager prior to the validation tasks being deployed to confirm if at least one of the multiple automobile vehicle to which the validation tasks may be requested has a capability to perform the validation analysis.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
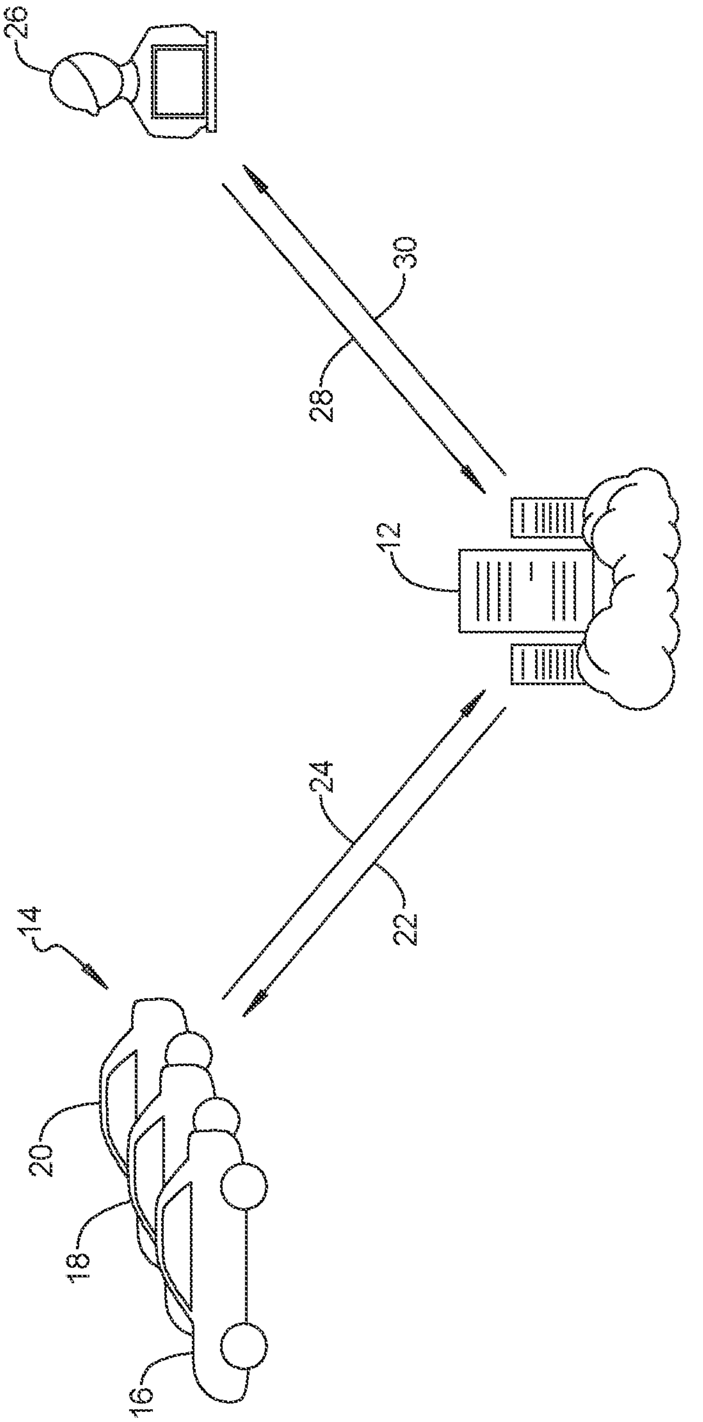
FIG. 1 is a diagrammatic presentation of principle features of an automobile vehicle continuous validation system according to an exemplary aspect.

Referring to FIG. 1, an automobile vehicle continuous validation system 10 includes a backend 12 which may include a remote computer, a server, a cloud-based computing system or the like. The backend 12 collects data from a vehicle fleet 14 which may contain multiple automobile vehicles 16, 18, 20 of multiple different makes and models which may be operating at any location in the world. The backend 12 wirelessly communicates with the vehicle fleet 14 via a wireless fleet communication uplink 22 which forwards tasks, jobs and queries to the vehicle fleet 14. Data including a group of vehicle profiles, validation progress and collected data is wirelessly returned via a wireless fleet communication downlink 24 from the vehicle fleet 14 to the backend 12.

The backend 12 is further in wireless communication with one or more clients 26. The clients 26 may include service users, suppliers, original equipment manufacturers (OEMs), government agencies and the like. The clients 26 wirelessly upload data and requests for vehicle fleet validation data to the backend 12 including validation requests, task definitions, and job queries via a wireless client communication uplink 28. In response to the validation requests, data including vehicle operation states, validation job progress, validation results and costs is returned from the backend 12 via a wireless client communication downlink 30. The clients 26 may thereby select a feature or features of at least one of the vehicles of the vehicle fleet 14 desired to be validated via a validation request, such as but not limited to autonomous vehicle handling, braking, steering, control and the like, and may further request fleet validation data already saved in the backend 12.

Referring to FIG. 2 and again to FIG. 1, a system diagram 32 identifies components of a vehicle module 34 provided on-board individual ones of the multiple automobile vehicles 16, 18, 20 of the vehicle fleet 14 which are used to perform on-board vehicle validation. The vehicle module 34 includes a wireless communication component 36 defining a wireless communication module which manages communications between the backend 12 and individual vehicle systems of one or more vehicles of the vehicle fleet 14. The wireless communication component 36 receives multiple tasks, multiple commands and multiple queries from the backend 12 and forwards validation results and the group of vehicle profiles from the vehicle fleet 14 to the backend 12.

A task manager 38 in communication with the wireless communication component 36 manages the multiple tasks, the multiple queries and the multiple commands, schedules execution of the multiple tasks, the multiple queries and the multiple commands based on predefined priorities and interacts with vehicle users as necessary. The task manager 38 further forwards results of validation requests, forwards requested and generated data, and forwards the group of vehicle profiles to the backend 12. The task manager 38 is in communication with a human-machine-interface (HMI) 40 and is further responsible to process an override signal 42 from any operator, user or passenger of one or more of the automobile vehicles of the vehicle fleet 14, which may for example result if a vehicle operator perceives that communication with the backend 12 is undesirable during a driving situation such as during rush hour or during inclement weather driving.

A job manager 44 in communication with the task manager 38 and a job executor 46 controls sensor gateways and vehicle systems so that relevant data will be received by the job executor 46 which is responsible to execute jobs. The job manager 44 also configures system resources and manages run-times of the requested jobs. A profile manager 48 in communication with the task manager 38 and the job executor 46 manages vehicle capability profiles including sensor configurations, types of sensors available, types of the automobile vehicles available, and maximum available resources. The profile manager 48 manages run-time profiles including resource usage and task and job statistics.

The vehicle module 34 further includes individual modules including a first gateway defining a sensor gateway 50 in communication with the job executor 46 and the job manager 44. The sensor gateway 50 communicates with multiple on-board sensors 52 providing sensed signals for the operating environment of the automobile vehicle. The individual modules of the vehicle module 34 further include a second gateway defining a vehicle system gateway 54 in communication with the job manager 44 which passes relevant data to be validated such as but not limited to vehicle lights, windshield wipers, door locks and the like received from multiple vehicle systems 56. The vehicle systems 56 include data to be validated such as noted above, and data not required to be validated such as vehicle power controls, battery controls and parking features. A storage unit 58 in communication with the job executor 46 and the task manager 38 stores copies of validation data. The storage unit 58 may be located in the individual modules of the vehicle module 34 or in the backend 12.

Uploaded packets of data 60 are passed from the wireless communication component 36 to the task manager 38. Downloaded packets of data 62 including for example validation results are passed from the task manager 38 to the wireless communication component 36.

Figure 2:
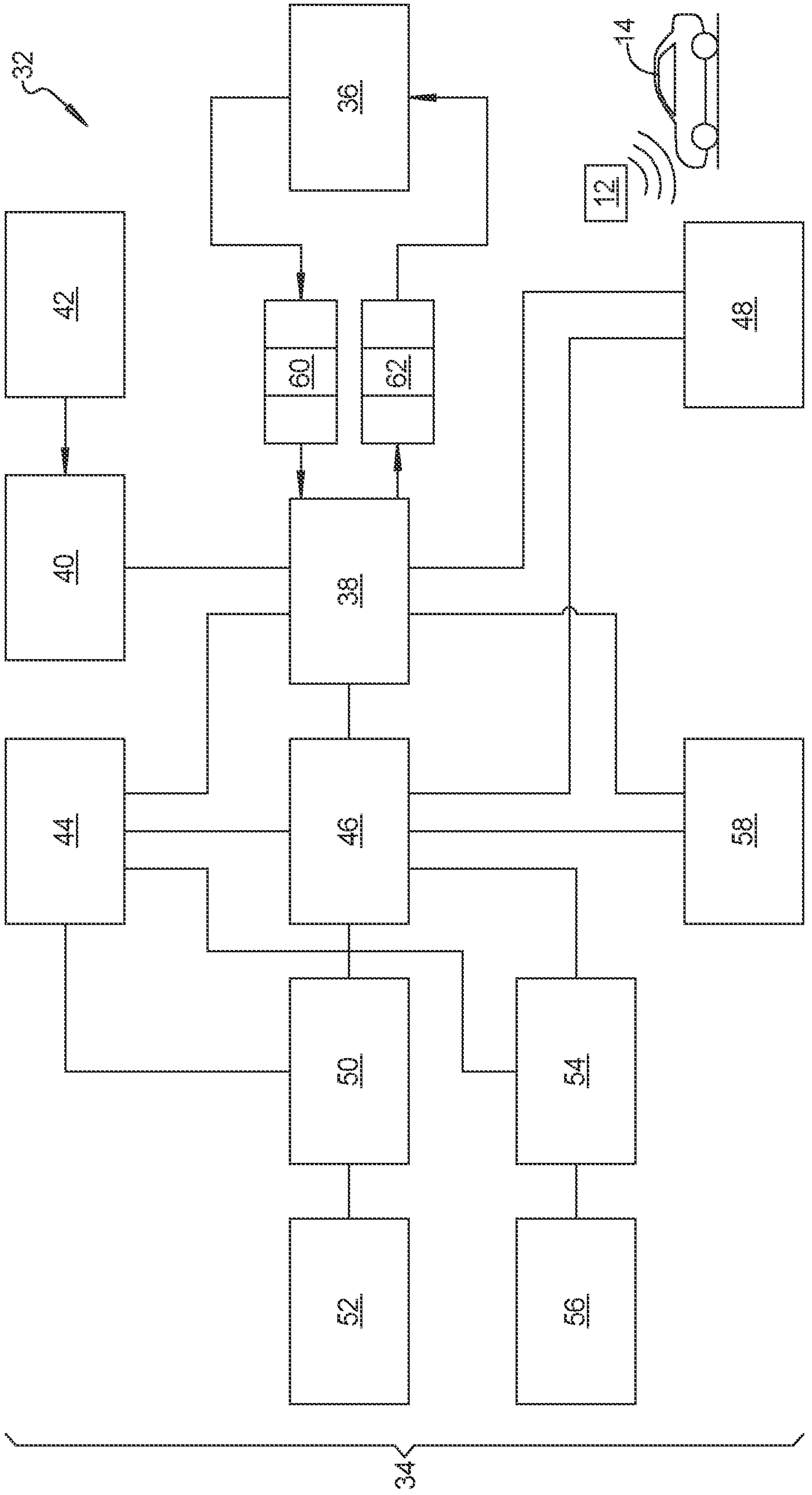
FIG. 2 is a system diagram identifying components of an individual vehicle module provided on-board an automobile vehicle of the system of FIG. 1.

Referring to FIG. 3 and again to FIGS. 1 and 2, a system diagram 64 identifies components of a fleet-based validation module 66. The fleet-based validation module 66 is provided either at the backend 12 or may be cloud based. The fleet-based validation module 66 manages data defining a configuration of and a capability of individual vehicles of the vehicle fleet 14, the capability including sensor configurations, types of sensors available, types of the automobile vehicles available, and maximum available resources. The fleet-based validation module 66 manages jobs the individual vehicles are working on and scheduled tasks for the vehicles, as well as validation data collected from individual vehicles. The fleet-based validation module 66 also creates, dispatches, pauses or cancels tasks to available ones of the automobile vehicles of the vehicle fleet 14.

The fleet-based validation module 66 includes a communication device 68 used to communicate with individual automobile vehicles of the vehicle fleet 14 having target features for validation. The communication device 68 provides input to and receives data from a validation manager 70. The validation manager 70 generates multiple validations tasks based on a user's definition or desired production of a validation task as well as a fleet vehicle availability. A fleet vehicle manager 72 in communication with a fleet vehicle database 74 and the communication device 68 maintains fleet vehicle information such as adding new vehicles to the fleet vehicle database 74 due to vehicle sales and removing old or discontinued vehicles. The fleet vehicle manager 72 also manages vehicle capability information, as well as updating new vehicle features and capabilities. The fleet vehicle manager 72 further provides search or query functions for finding capable vehicles in the fleet in support of a requested validation task. The fleet vehicle manager 72 communicates with a program, manufacture and sales interface 78 to extract data used to update the fleet vehicle database 74.

A security manager 79 in communication with the communication device 68 ensures a task defined by a user as well as algorithms required to perform a validation operation are secure and safe. The security manager 79 communicates with a user manager 80 and a user interface 82. The user manager 80 manages a user's profiles, user requested tasks, validation data and task costs. For example, the user manager 80 identifies if a user has paid for a requested or for past requested services, identifies if a potential user is registered to use the system and monitors a list of users to maintain which users maintain access rights to the system. The user interface 82 selects data from the fleet vehicle database 74 and the fleet vehicle manager 72 to identify data required for performance of a validation request.

A cost center 84 communicates with the validation manager 70 and the user manager 80 to identify if incentives may be available to apply to user analysis and validation requests and identifies costs to collect and analyze data available in the system when a task is received and verified. An emulator 86 in communication with the validation manager 70 allows tasks to be conducted to be profiled prior to being deployed to confirm if a vehicle to which a task may be requested has the capability to perform the validation work. Tasks therefore cannot be forwarded to a requested vehicle which fails the emulation test, thereby saving computation time and cost. All data used and all requests for validation made to or by the system may be saved in a storage device 88, which may be local or cloud based.

Figure 3:
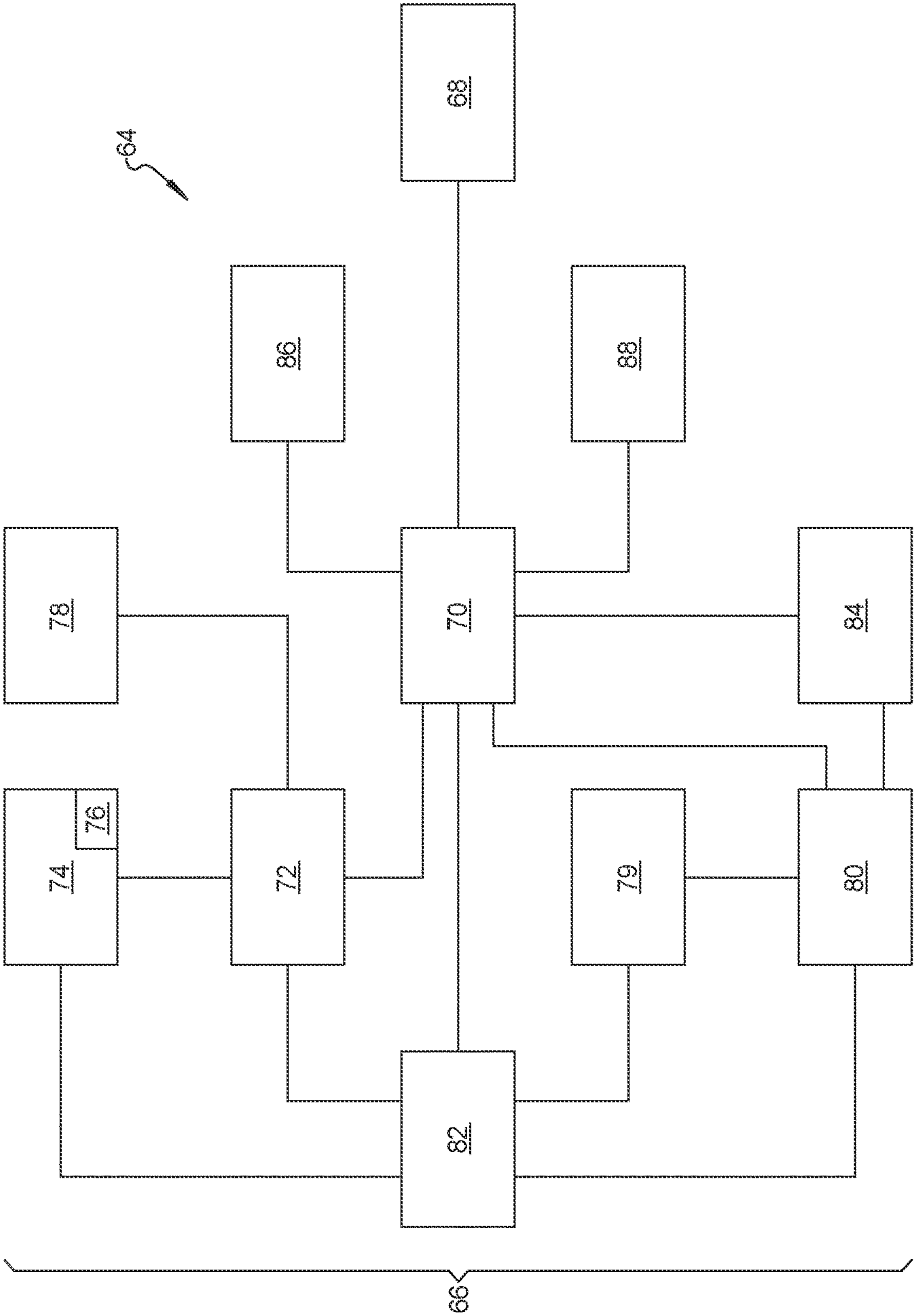
FIG. 3 is a system diagram having components of a fleet-based validation module for the system of FIG. 1.
Figure 4:
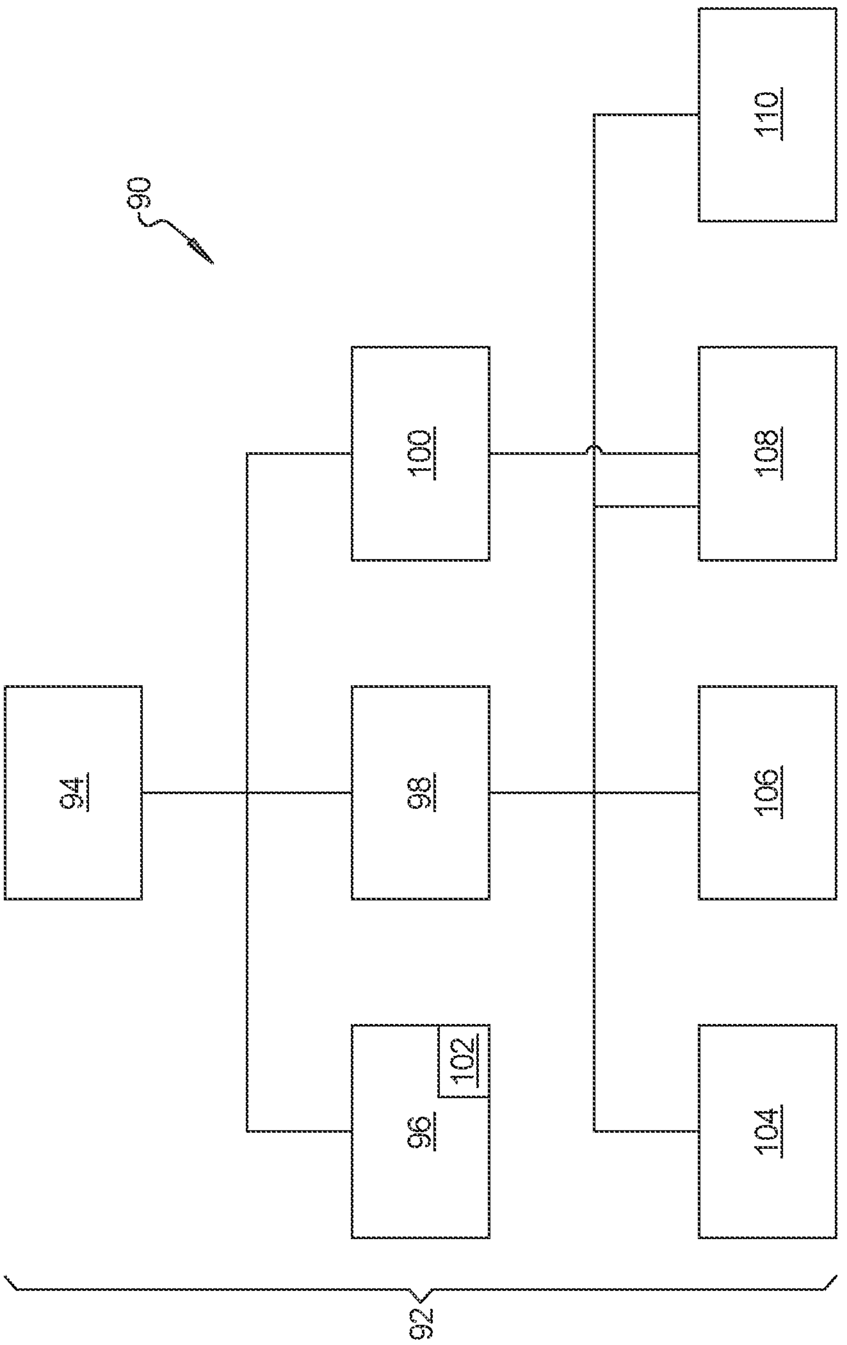
FIG. 4 is a system diagram identifying elements of a client-side module of the system of FIG. 1.

Referring to FIG. 4 and again to FIGS. 1 through 3, a system diagram 90 identifies elements of a client-side module 92 which is remote from the vehicles of the vehicle fleet 14 and represents interface items applied by a system client seeking to perform a validation analysis. The client-side module 92 includes a client interface 94 monitoring and controlling client requests output to the fleet-based validation module 66 and validation data returned to a client. The client interface 94 communicates with an account management component 96, a validation request management component 98 and a fleet management component 100. The account management component 96 manages a status of individual client or customer accounts and includes a dedicated storage device 102 having algorithms in the form of tasks to be validated and any related referencing algorithms. The validation request management component 98 permits the client or customer to generate estimates of required computing resources necessary to respond to a client request for data. The fleet management component 100 allows the client or customer to identify and select one or more vehicles available in the vehicle fleet 14 that have necessary sensor and computing capabilities for a desired validation task.

The validation request management component 98 communicates with individual ones of a validation process monitor 104, a validation process manager 106, a validation strategy component 108 and an analysis and visualization component 110. The validation process monitor 104 provides monitoring capability for the client to monitor live progress of a validation operation and allows the client to assess and check the validation progress and the data collected during the process. The validation process manager 106 allows the client to manage the validation process such as restart, pause, resume, and terminate a validation process. The validation strategy component 108 allows a client to define validation metrices and deploy target and referencing algorithms and matrices to a selected vehicle or vehicles. The analysis and visualization component 110 allows the client to calculate a total cost of the validation task, to manage and visualize different scenarios prior to sending a validation task request including identifying how many vehicles and which vehicles to include in the task request, and to perform analysis and visualization with the captured data.

An automobile vehicle continuous validation system of the present disclosure provides an architecture and system which allows OEMS to use massive productions of vehicles as a platform to assist AV/ADAS feature validation.

An automobile vehicle continuous validation system of the present disclosure offers several advantages. These include a system that treats validation as a service performing on-demand tasks. The system design supports collaboration of vehicles, backend servers, and validation experts. A client-based, need-driven selection from a fleet of vehicles provides large amounts of data generation instead of performing validation based on a small number of test vehicles.

A continuous validation allows validating some feature(s) at every time a vehicle is operating, and thus may cover more scenarios that are difficult to construct or test during a testing phase. A system of the present disclosure allows validating one or more features already in production to further performance tuning and improvements, and also provides for validating new features that are not in a production vehicle yet.

A controller as used herein is a non-generalized, electronic control device having a preprogrammed digital computer or processor, memory or non-transitory computer readable medium used to store data such as control logic, software applications, instructions, computer code, data, lookup tables, etc., and a transceiver or input/output ports. A computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium may also include media where data can be permanently stored and media where data can be stored and later overwritten, such as a rewritable optical disc or an erasable memory device. Computer code includes any type of program code, including source code, object code, and executable code. A processor is configured to execute the code or instructions. Where the automobile vehicle of the vehicle fleet 14 is a motor vehicle, an autonomous vehicle, an electric vehicle or the like, a controller or module may be a dedicated Wi-Fi controller or an engine control module, a transmission control module, a body control module, an infotainment control module, etc. A wireless transfer device may include a transceiver configured to wirelessly communicate with a hotspot or the cloud using Wi-Fi protocols for example under Institute of Electrical and Electronics Engineers (IEEE) 802.11x.

The automobile vehicle further includes one or more applications. An application is a software program configured to perform a specific function or set of functions. The application may include one or more computer programs, software components, sets of instructions, procedures, functions, objects, classes, instances, related data, or a portion thereof adapted for implementation in a suitable computer readable program code. The applications may be stored within a memory of a module or in additional or separate memory.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automobile vehicle continuous validation system, comprising:

a backend collecting data from a vehicle fleet and wirelessly communicating with the vehicle fleet, the backend further in wireless communication with at least one client;

a vehicle module provided on-board individual ones of multiple automobile vehicles of the vehicle fleet and performing an on-board vehicle validation analysis;

a fleet-based validation module provided either at the backend or cloud based, the fleet-based validation module managing data defining a configuration of and a capability profile of the multiple automobile vehicles of the vehicle fleet;

a validation manager generating multiple validation tasks based on a user's definition or a desired production of the multiple validation tasks included in the validation analysis and a fleet vehicle availability; and a client-side module remote from the multiple automobile vehicles of the vehicle fleet having interface items applied by the at least one client seeking to perform the validation analysis.

2. The automobile vehicle continuous validation system of claim 1, wherein the vehicle module includes:

a wireless communication component managing communications between the backend and individual vehicle systems of the multiple automobile vehicles; and a task manager receiving the multiple validation tasks, multiple queries and multiple commands, scheduling execution of the multiple validation tasks, the multiple queries and the multiple commands based on predefined priorities and interacting with vehicle users, and forwarding results of validation task requests, requested and generated data, and a group of vehicle profiles to the backend.

3. The automobile vehicle continuous validation system of claim 2, further including a human-machine-interface (HMI), the task manager further in communication with the HMI and responsible to process an override signal from a user of one or more of the automobile vehicles of the vehicle fleet received via the HMI.

4. The automobile vehicle continuous validation system of claim 2, wherein the task manager is in communication with the wireless communication component, and further including a validation request management component permitting the at least one client to generate estimates of required computing resources necessary to respond to a client request for data.

5. The automobile vehicle continuous validation system of claim 2, wherein the wireless communication component receives the multiple validation tasks, the multiple queries and the multiple commands from the backend and forwards validation analysis results and the group of vehicle profiles from the vehicle fleet to the backend.

6. The automobile vehicle continuous validation system of claim 1, including:

a wireless client communication uplink, the at least one client in communication with the wireless client communication uplink to wirelessly upload data and requests for vehicle fleet validation data to the backend including the multiple validation requests, task definitions, and job queries via the wireless client communication uplink; and a wireless client communication downlink wherein data including vehicle operation states, validation job progress, validation results and costs is returned via the wireless client communication downlink to the backend.

7. The automobile vehicle continuous validation system of claim 1, wherein the client-side module includes a client interface to monitor and control requests from the at least one client sent to the fleet-based validation module and validation data returned to the at least one client.

8. The automobile vehicle continuous validation system of claim 1, further including a fleet vehicle manager in communication with a fleet vehicle database and a communication device, the fleet vehicle manager maintaining fleet vehicle information including adding new vehicles to the fleet vehicle database, removing old or discontinued vehicles from the fleet vehicle database, managing the vehicle capability profile wherein the vehicle capability profile includes sensor configurations, types of sensors available, types of the automobile vehicles available, and maximum available resources, and updating new vehicle features and capabilities.

9. The automobile vehicle continuous validation system of claim 1, wherein:

the vehicle fleet contains multiple automobile vehicles of multiple different makes and models operating at any world location; and the at least one client includes service users, suppliers, original equipment manufacturers (OEMs), and government agencies.

10. The automobile vehicle continuous validation system of claim 1, including an emulator in communication with the validation manager operating to profile the multiple validation tasks prior to being deployed to confirm if a vehicle to which the multiple validation tasks may be requested has a capability to perform the validation analysis.

11. An automobile vehicle continuous validation system, comprising:

a backend collecting data from at least one automobile vehicle and wirelessly communicating with the at least one automobile vehicle, the backend further in wireless communication with at least one client;

a vehicle module provided on-board the least one automobile vehicle and performing a validation analysis;

a validation manager generating multiple validation tasks for the validation analysis based on a user's definition or a desired production of the multiple validation tasks and an availability of the at least one automobile vehicle;

an emulator profiling the validation tasks prior to being deployed to confirm if the at least one automobile vehicle to which the multiple validation tasks is requested has a capability to perform the validation analysis; and a client-side module remote from the at least one automobile vehicle having interface items applied by the at least one client seeking to perform the validation analysis.

12. The automobile vehicle continuous validation system of claim 11, wherein the at least one automobile vehicle defines multiple automobile vehicles of a vehicle fleet.

13. The automobile vehicle continuous validation system of claim 12, further including a fleet-based validation module in communication with the validation manager provided either at the backend or cloud based, the fleet-based validation module managing data defining a configuration of and a capability profile of the multiple automobile vehicles of the vehicle fleet.

14. The automobile vehicle continuous validation system of claim 12, including:

a wireless communication module receiving the multiple validation tasks, multiple queries and multiple commands, and scheduling execution of the multiple validation tasks based on predefined priorities, and interacting with vehicle users; and a wireless client communication downlink wherein in response to the multiple validation tasks, data including vehicle operation states, validation job progress, validation results and costs is returned from the backend via a wireless client communication downlink.

15. The automobile vehicle continuous validation system of claim 14, including:

a task manager in communication with the wireless communication module;

a job manager in communication with the task manager; and a job executor responsible to execute jobs and controlling multiple sensor gateways and vehicle systems so that data will be received by the job executor.

16. The automobile vehicle continuous validation system of claim 15, including a profile manager in communication with the task manager and the job executor and managing vehicle capability profiles including sensor configurations, types of sensors available, types of available ones of the multiple automobile vehicles of the vehicle fleet, and maximum available resources, the profile manager also managing run-time profiles including resource usage and task and job statistics.

17. The automobile vehicle continuous validation system of claim 16, including:

a first gateway defining a sensor gateway in communication with the job executor and the job manager, the sensor gateway communicating with multiple on-board sensors of the multiple automobile vehicles of the vehicle fleet generating sensed signals for an operating environment of the multiple automobile vehicles of the vehicle fleet; and a second gateway defining a vehicle system gateway in communication with the job manager.

18. A method for performing continuous validation of a vehicle fleet, comprising:

collecting data from the vehicle fleet via a backend and wirelessly communicating with the vehicle fleet, the backend further wirelessly communicating with at least one client;

performing an on-board vehicle validation analysis using a vehicle module provided on-board individual ones of multiple automobile vehicles of the vehicle fleet;

managing data defining a configuration of and capability profiles of the multiple automobile vehicles of the vehicle fleet using a fleet-based validation module provided either at the backend or cloud based;

generating validation tasks using a validation manager based on a user's definition or a desired production of the validation tasks of the validation analysis and a fleet vehicle availability; and applying interface items via a client-side module remote from the multiple automobile vehicles of the vehicle fleet by the at least one client seeking to perform the validation analysis.

19. The method of claim 18, further including maintaining fleet vehicle information including adding new vehicles to a fleet vehicle database, removing old or discontinued vehicle data from the fleet vehicle database, managing the capability profiles including sensor configurations, types of sensors available, types of the automobile vehicles available, and maximum available resources, and updating new vehicle features and capabilities using a fleet vehicle manager in communication with the fleet vehicle database and a communication device.

20. The method of claim 18, further including profiling the validation tasks using an emulator in communication with the validation manager prior to the validation tasks being deployed to confirm if at least one of the multiple automobile vehicle to which the validation tasks may be requested has a capability to perform the validation analysis.

* * * * *